United States Patent [19]

Mack et al.

[11] Patent Number: 5,729,484
[45] Date of Patent: Mar. 17, 1998

[54] PROCESSES, APPARATUSES, AND SYSTEMS OF ENCODING AND DECODING SIGNALS USING TRANSFORMS

[75] Inventors: Walter Mack, Chandler; J. C. Korta, Mesa, both of Ariz.; Mark Walker, Hillsboro, Oreg.

[73] Assignee: Intel Corporation, Santa Clara, Calif.

[21] Appl. No.: 446,321

[22] Filed: May 22, 1995

Related U.S. Application Data

[63] Continuation-in-part of Ser. No. 202,529, Feb. 28, 1994, abandoned.

[51] Int. Cl.$^6$ .............................. G06F 17/14; G06K 9/36
[52] U.S. Cl. .............................. 364/725; 382/240
[58] Field of Search .............................. 364/725, 726, 364/727; 382/240, 250

[56] References Cited

U.S. PATENT DOCUMENTS

| | | | |
|---|---|---|---|
| 4,302,775 | 11/1981 | Widergren et al. | 358/136 |
| 4,449,194 | 5/1984 | Wilhelm | 364/735 |
| 4,698,698 | 10/1987 | Tzou | 364/725 X |
| 4,791,598 | 12/1988 | Liou et al. | 364/725 |
| 4,829,465 | 5/1989 | Knauer et al. | 364/725 |
| 5,029,122 | 7/1991 | Uetani | 364/725 |
| 5,054,103 | 10/1991 | Yasuda et al. | 364/725 X |
| 5,107,345 | 4/1992 | Lee | 358/136 X |
| 5,157,488 | 10/1992 | Pennebaker | 358/133 |
| 5,196,933 | 3/1993 | Henot | 358/133 X |
| 5,224,062 | 6/1993 | McMillan, Jr. et al. | 364/725 |
| 5,235,420 | 8/1993 | Gharavi | 358/136 |
| 5,249,146 | 9/1993 | Uramoto | 364/725 |
| 5,253,192 | 10/1993 | Tufts | 364/726 |
| 5,260,782 | 11/1993 | Hui | 358/133 |
| 5,333,212 | 7/1994 | Ligtenberg | 358/56 |
| 5,341,318 | 8/1994 | Balkanski et al. | 364/725 |
| 5,351,095 | 9/1994 | Kerdranvat | 348/699 |
| 5,367,629 | 11/1994 | Chu et al. | 395/162 |
| 5,371,611 | 12/1994 | Kato et al. | 358/456 |
| 5,414,469 | 5/1995 | Gonzales et al. | 348/408 |
| 5,446,495 | 8/1995 | Tourtier et al. | 348/398 |

OTHER PUBLICATIONS

Practical Fast 1–D DCT Algorithms with 11 Multiplications, by Christoph Loeffler, Adriaan Ligtenberg, and George S. Moschytz, 1989 IEEE; pp. 988–991.

IEEE Standard Specifications for the Implementations of 8×8 Inverse Discrete Cosine Transform, IEEE STd. 1/80–1990, Jul. 16, 1992; 14 pages.

Prioritized DCT for Compression and Progressive Transmission of Images, by Yunming Huang, Howard M. Dreizen, and Nikolas P. Galatsanos, Members, IEEE, published by IEEE Transactions on Image Processing, vol. 1 No. 4, dated Oct. 1992; pp. 477–487.

Discrete Cosine Transform Algorithms, Advantages, Applications, by K.R. Rao and P. Yip, published by Academic Press, Inc., dated 1990; 33 pages.

Allen et al., "The Multiply-Free Chen Transform—A Rational Approach to JPFG," 1991, pp. 237–240.

McMillan et al., "A Forward–Mapping Realization of the Inverse Discrete Cosine Transform," Sun Microsystems, Inc., Research Triangle Park, NC 27709, 1992, pp. 219–228.

Wavelets and Image Compression by John C. Huffman, SMPTE Journal, Nov. 1994, pp. 723–727.

*Primary Examiner*—Chuong D. Ngo
*Attorney, Agent, or Firm*—William H. Murray; N. Stephan Kinsella

[57] ABSTRACT

A signal is encoding, in part, by generating the transform of the signal in a transform domain. The coefficients of the transformed signal are then ordered according to a statistical model of the transform. Decoding of the encoded signal generates progressively accurate approximations of the fully reconstructed signal. If, for some reason, decoding is truncated, a useable partial result will nevertheless be available. In a preferred embodiment, natural image signals are encoded by ordering the coefficients of the transformed signal generated by applying a discrete cosine transform. Decoding of the encoded signals generates progressively accurate approximations of the fully reconstructed image. The invention has particular application to systems with limited and/or variable transmission, storage, and/or decode processing bandwidth.

36 Claims, 8 Drawing Sheets

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 8

PROCESSES, APPARATUSES, AND SYSTEMS OF ENCODING AND DECODING SIGNALS USING TRANSFORMS

This is a continuation-in-part of U.S. application Ser. No. 08/202,529, filed on Feb. 28, 1994, now abandoned.

BACKGROUND OF THE INVENTION

1. Field of the Invention

The present invention relates to signal processing, and, in particular, to computer-implemented processes, apparatuses, and systems for encoding and decoding signals, such as video signals, using a transform, such as a discrete cosine transform.

2. Description of the Related Art

Digital encoding, transmission, and storage of signals representing natural images play an increasing role in today's personal computer (PC) environment. Bit-mapped coding of images is used primarily because of its convenient use in display and capture technology. However, bitmaps are inefficient with regard to storage and transmission bandwidth. This is because a bit-mapped representation of a natural image contains a lot of redundant information. It is known in the art to apply compression techniques to exploit this redundancy.

One known method for compressing image signals is to transform the signals from a spatial domain to a corresponding transform domain. For example, the discrete cosine transform (DCT) may be used to convert video image signals in the spatial pixel domain to transformed signals in the frequency domain. These transformed signals may then be further encoded using such known techniques as quantization and run-length encoding. The encoded (i.e., compressed) signals may be transmitted in real-time for receipt and playback at a remote location or stored in a storage device for future recovery and playback. Playing back the encoded signals involves inverting the forward discrete cosine transform (FDCT) processing by applying the corresponding inverse discrete cosine transform (IDCT).

It is known in the art to perform the IDCT using certain schemes to increase the speed of processing and reduce the overall amount of time required to decode (i.e., decompress) the encoded signals. Such schemes are described by C. Loeffler, A. Ligtenberg, and G. Moschytz, "Practical Fast 1-D DCT Algorithms with 11 Multiplications" (IEEE ICASSP 1989, Vol 2, pp. 988–991). Other inverse transform schemes are taught by K. R. Rao and P. Yip in *Discrete Cosine Transform: Algorithms, Advantages, Applications*, Academic Press, Inc. (1990 San Diego) (ISBN 0-12-580203-X).

In a computer system with a limited amount of processing capacity, faster inverse transform processing permits the processing of more signal data in real-time. In video processing, faster IDCT processing allows more flames per second, larger flames, and/or flames with greater resolution to be decoded and displayed, providing enhanced playback with greater visual fidelity.

One problem with known methods and systems for performing inverse transform processing, such as IDCT processing, is that the entire inverse transform must be completed before a useable result is attained. In computer systems with limited processing capability, such IDCT processing may be impossible or may produce unsatisfactory results. For example, in video processing, frame rates may be limited to very low numbers. Image size and resolution may also be limited.

In other computer systems having dynamic processing loads, processing capacity may be sufficient to provide satisfactory results under normal circumstances, but infrequent and possibly random events may occur that reduce the amount of processing capacity that may be available for IDCT processing. Under known IDCT processing schemes, video frames may have to be dropped in order to accommodate the varying processing load, resulting in an undesirable visual result.

What is needed is a technique for performing inverse transform processing, such as IDCT processing, that can be implemented on systems having different processing capacities and on systems having variable processing load requirements.

It is accordingly an object of this invention to overcome the disadvantages and drawbacks of the known art and to provide computer-implemented processes and apparatuses for implementing inverse transform processing on computer systems having different processing capacities and on computer systems having variable processing load requirements.

It is a particular object of the present invention to provide a computer-implemented process and apparatus for implementing inverse transforms quickly and efficiently.

It is a particular object of the present invention to provide computer-implemented processes and apparatuses for encoding and decoding video signals using the discrete cosine transform.

Further objects and advantages of this invention will become apparent from the detailed description of a preferred embodiment which follows.

SUMMARY OF THE INVENTION

The present invention is a computer-implemented process, apparatus, and system for encoding signals. According to a preferred embodiment, an original signal is provided and a transform is applied to the original signal to generate a transformed signal, where the transformed signal comprises a plurality of transformed signal coefficients. The transformed signal coefficients are ordered in accordance with a statistical model corresponding to the transform and an encoded signal is generated in accordance with the ordered coefficients.

The present invention is also a computer-implemented process, apparatus, and system for decoding signal. According to a preferred embodiment, an encoded signal is provided, where the encoded signal comprises a plurality of ordered coefficients. The ordered coefficients correspond to a plurality of transformed signal coefficients ordered in accordance with a statistical model corresponding to a transform. The plurality of transformed signal coefficients were generated by transforming an original signal in accordance with the transform. The first ordered coefficient of the encoded signal is selected and a first approximation of a decoded signal corresponding to the encoded signal is generated in accordance with the first ordered coefficient. The next ordered coefficient of the encoded signal is then selected and an updated approximation of the decoded signal is generated in accordance with the next ordered coefficient and the previously generated approximation. The selection of next ordered coefficients and generation of updated approximations is repeated for each ordered coefficient of the encoded signal.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention is directed to the encoding and decoding of signals using transforms in which the coefficients of the signals in the transform domain are ordered according to a statistical model of the transform. Such ordering may be used in the decoding process to generate progressively accurate approximations of the fully reconstructed signal. In a preferred embodiment of the present invention, video image signals are encoded and decoded using the discrete cosine transform. The coefficients of the transformed video signals are ordered to exploit the fact that for most natural images many transformed signal coefficients are zero or close to zero.

Figure 1:
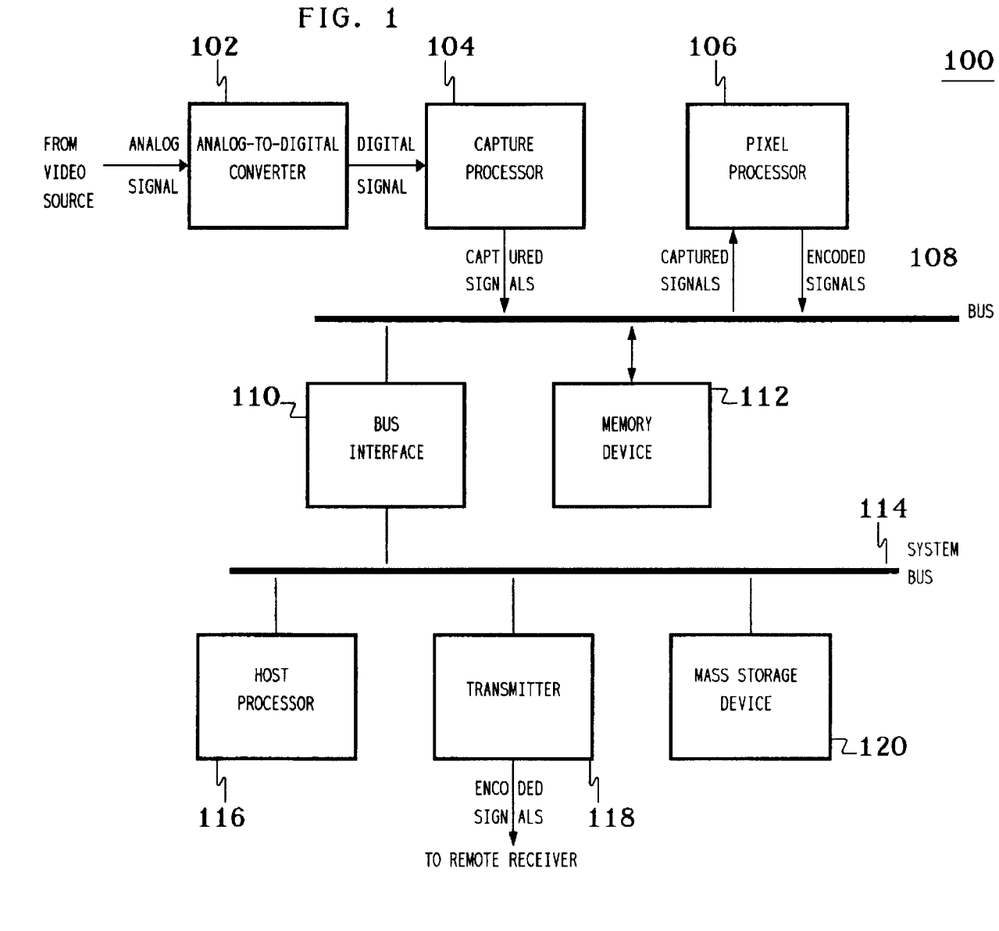
FIG. 1 is a computer system for encoding video signals, according to a preferred embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in a preferred embodiment, Y, U, and V component signals).

Capture processor 104 receives, captures, and stores the digitized component signals as subsampled video frames in memory device 112 via bus 108. Each subsampled video frame is represented by a set of two-dimensional component planes or pixel bitmaps, one for each component of the digitized video signals. In a preferred embodiment, capture processor 104 captures video signals in a YUV9 format, in which every (4×4) block of pixels of the Y component plane corresponds to a single pixel in the U component plane and a single pixel in the V component plane.

Pixel processor 106 accesses the captured bitmaps from memory device 112 via bus 108 and generates encoded video signals that represent the captured video signals. Depending upon the particular encoding algorithm implemented, pixel processor 106 applies a sequence of compression techniques to reduce the amount of data used to represent in the information in the video signals. The encoded video signals may then be stored to memory device 112 via bus 108 for eventual transmission to host processor 116 via bus 108, bus interface 110, and system bus 114.

Host processor 116 may transmit the encoded video signals to transmitter 118 for real-time transmission to a remote receiver (not shown in FIG. 1), store the encoded video signals to mass storage device 120 for future processing, or both. In an alternative embodiment, encoding system 100 does not have a pixel processor 106. In this alternative embodiment, the captured video signals are read from memory device 112 and encoded by host processor 116.

Figure 2:
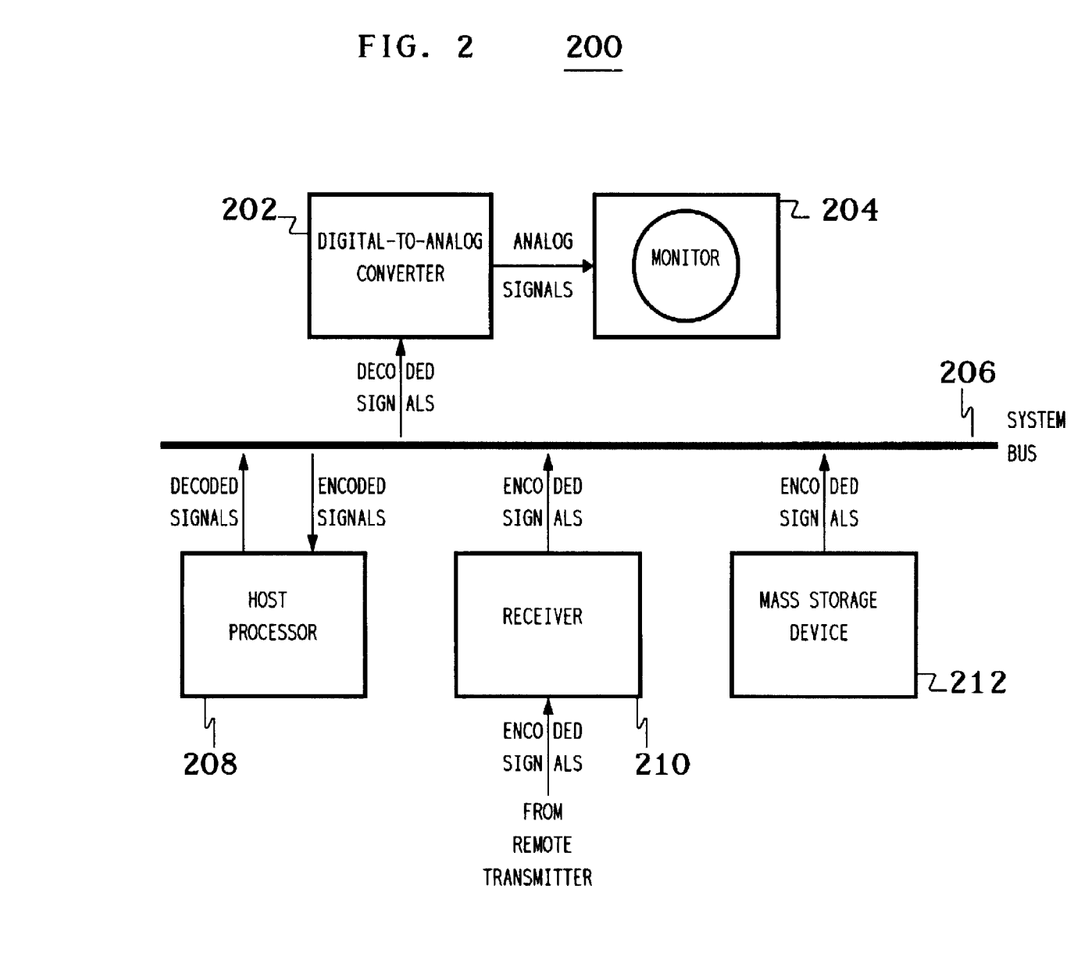
FIG. 2 is a computer system for decoding the video signals encoded by the computer system of FIG. 1, according to a preferred embodiment of the present invention.

Referring now the FIG. 2, there is shown a computer system 200 for decoding the video signals encoded by encoding system 100 of FIG. 1, according to a preferred embodiment of the present invention. Host processor 208 of decoding system 200 receives encoded video signals via system bus 206 that were either stored in mass storage device 212 or received by receiver 210 from a remote transmitter, such as transmitter 118 of FIG. 1.

Host processor 208 decodes the encoded video signals and scales the decoded video signals for display. Decoding the encoded video signals involves undoing the compression processing implemented by pixel processor 106 of encoding system 100 of FIG. 1. Scaling the decoded video signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the video signals as original captured. Host processor 108 then transmits the scaled video signals to digital-to-analog (D/A) converter 202 via system bus 206. D/A converter converts the digital scaled video signals to analog video signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. Pixel processor 106 may be any suitable means for encoding subsampled video signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia-II® board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or remote area network.

Referring now to FIG. 2, decoding system 200 is preferably a general microprocessor-based personal computer (PC) system similar to the basic PC system of encoding system 100. In particular, host processor 208 may be any suitable means for decoding and scaling encoded video signals and is preferably an Intel® general purpose microprocessor such as an Intel® 386, 486, or Pentium® processor. In an alternative preferred embodiment, decoding system 200 may also have a pixel processor similar to pixel processor 106 of FIG. 1 for decoding the encoded video signals and a display processor such as an Intel® i750® Display Processor for scaling the decoded video signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for convening digital video signals to analog video signals and is preferably implemented through a personal computer (PC)-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video signals. Those skilled in the art will understand that such a combined system may be used to display decoded video signals in real-time during the capture and encoding of video signals to monitor the encoding processing.

Figure 3:
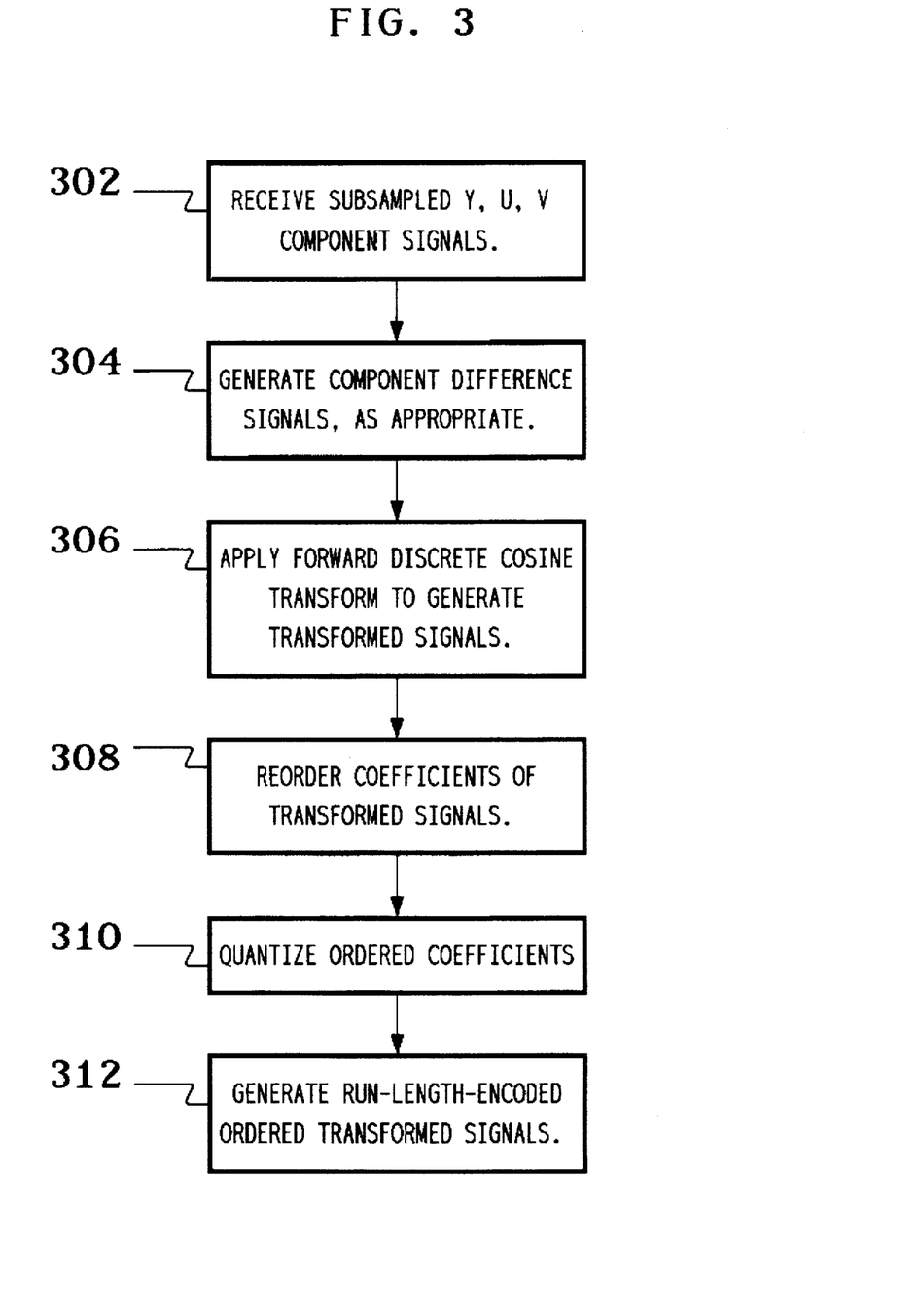
FIG. 3 is a process flow diagram of the encoding processing implemented by the computer system of FIG. 1.

Referring now to FIG. 3, there is shown a process flow diagram of the compression processing implemented by computer system 100 of FIG. 1, according to a preferred embodiment of the present invention. Pixel processor 106 receives the subsampled Y, U, and V component signals (block 302 of FIG. 3). Pixel processor 106 then generates component difference signals, as appropriate (block 304). Those skilled in the art will understand that these component different signals may correspond to interframe differences or intraframe differences or both.

Pixel processor 106 then applies a forward discrete cosine transform (FDCT) to the component difference signals to generate transformed signals (block 306). FDCT processing of an (8×8) block of pixels may be represented as Equation (1) as follows:

$$y(u,v) = \tfrac{1}{4}C(u)C(v) \sum_{i=0}^{7}\sum_{j=0}^{7} x(i,j)\cos\left(\frac{(2i+1)u\pi}{16}\right)\cos\left(\frac{(2j+1)v\pi}{16}\right), \quad (1)$$

where $x(i,j)$ is the component value or component difference value for the pixel in row i, column j of the (8×8) block in the spatial domain; $y(u,v)$ is the coefficient for the pixel in row u, column v of the corresponding (8×8) block in the transform domain; and $$C(0) = \frac{1}{\sqrt{2}} \quad (2)$$

and $$C(u) = C(v) = 1, \; u,v = 1, \ldots, 7. \quad (3)$$

Equation (1) can be rewritten in matrix form as in the Equation (4) as follows:

$$Y = FX, \quad (4)$$

where $$Y = \begin{bmatrix} y_0 \\ y_1 \\ \ldots \\ y_{63} \end{bmatrix}, \quad (5)$$

$$F = \begin{bmatrix} f_{0,0} & f_{1,0} & \cdots & f_{0,63} \\ f_{0,1} & & & \\ \ldots & & & \\ f_{63,0} & & & f_{63,63} \end{bmatrix}, \quad (6)$$

$$X = \begin{bmatrix} x_0 \\ x_1 \\ \ldots \\ x_{63} \end{bmatrix}. \quad (7)$$

In Equation (4), X represents the 64 pixel component difference values in vector form for an (8×8) block of a component plane, Y represents the 64 coefficients of the transformed component values in vector form in the transform domain, and F represents the discrete cosine transform in matrix form having elements $f_{ij}$.

Figure 4:
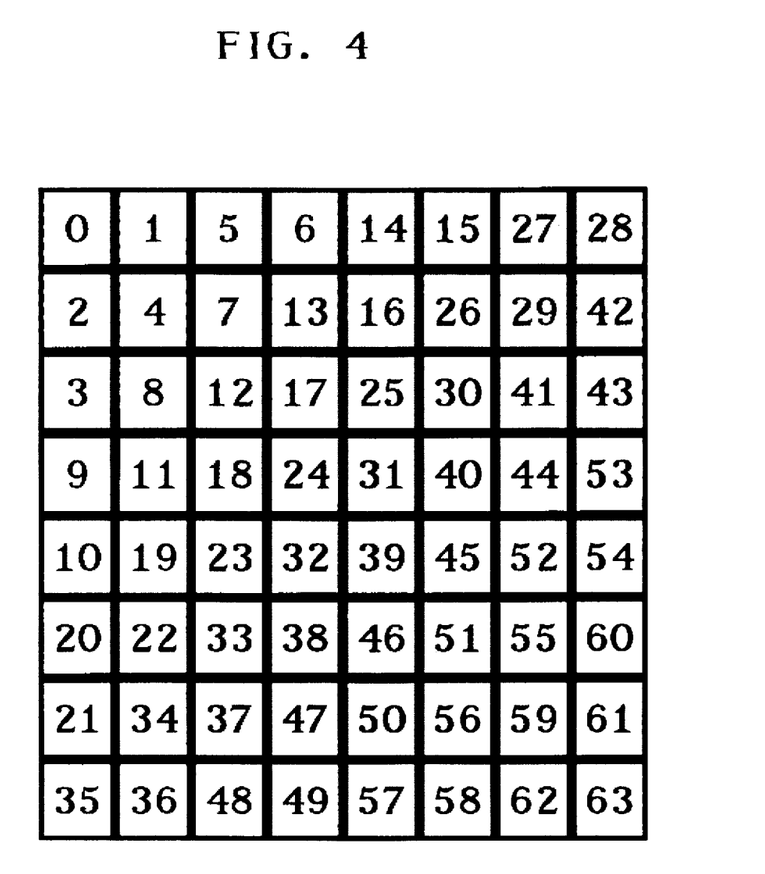
FIG. 4 shows a zig-zag scan sequence, one of the preferred scan sequences used by the computer system of FIG. 1.

As described above, each (8×8) pixel block is represented by the vector signal X, where the sequence of pixels in the vector signal is determined by a selected scan sequence. FIG. 4 shows a zig-zag scan sequence, one of the preferred scan sequences for generating vector signal X, where each number represents the position of the corresponding pixel in the vector signal X. Those skilled in the art will understand that alternative embodiments of the present invention may implement other scan sequences such as row by row or column by column scanning. In general, a preferred scan sequence is one that exploits the spatial redundancy of adjacent pixels inherent in typical natural images.

As defined above, forward discrete cosine transforms of natural images exhibit certain general trends. First, many of the coefficients $y_i$ of the transformed signal in the transform domain may be zero or close enough to zero to be represented as zero without significant loss of fidelity in the decoded image. Second, there is a predictability to whether the particular coefficients $y_i$ may be represented by zero.

That is, certain coefficients $y_i$ in the transformed signal Y tend to be zero or close to zero more frequently than other coefficients $y_i$.

Statistical analysis may be performed off-line to determine the predictability of a coefficient $y_i$ being zero. Such statistical analysis may be empirical, that is, based on an analysis of a set of test images representative of the images to be processed. Statistical analysis may generate an expected value for each coefficient $y_i$ in the transformed signal Y, where the expected value represents the mean value for the coefficient for the natural images upon which the analysis is based.

According to the present invention, the coefficients $y_i$ of each transformed signal Y generated using Equation (4) are re-ordered according to ascending likelihood that the coefficient is zero (block 308), such that the first coefficient in the ordered transformed signal is the coefficient $y_i$ with the expected value with the greatest magnitude (i.e., the furthest from zero) and the last coefficient in the ordered vector is the coefficient $y_i$ with the expected value with the smallest magnitude (i.e., the closest to zero). The magnitude of the expected value is used since expected values may be positive or negative.

The statistical model may be empirically generated off-line by performing transformations on different video sequences. Under the statistical model, each coefficient is assigned an expected value, where the expected value represents the mean value for that coefficient for all of the blocks of the different video sequences used during the off-line analysis. The expected value is not the same thing as the actual value of the coefficient for the current block of pixels. The expected value for a coefficient is a value assigned for that coefficient for all blocks encoded using the same statistical model. The actual coefficient value will vary from block to block.

The coefficient whose expected value has the greatest magnitude is reordered as the first coefficient in the set of ordered coefficients; the coefficient whose expected value has the second greatest magnitude is reordered as the second coefficient; and so on, down to the coefficient whose expected value has the smallest magnitude, which is reordered as the last coefficient.

For example, if, according to the statistical model, $y_5$ of Equation (5) had the expected value with the greatest magnitude, and $y_{23}$ had the expected value with the second greatest magnitude, and $y_{11}$ had the expected value with the smallest magnitude, then the coefficients of Equation (5) would be reordered for each block of coefficients in the following sequence: $(r_0, r_1, \ldots, r_{63}) = (y_5, y_{23}, \ldots, y_{11})$, where the $r_i$ are the reordered coefficients. The relative magnitude of expected values determines the order for scanning the coefficients $y_i$ of Equation (5) to generate the reordered coefficients $r_i$ in accordance with the statistical model.

After the coefficients of the transformed signal are ordered, they are preferably quantized for representation as digital binary integers in the ordered signal (block 310). As a result, the first one or more coefficients in a typical ordered signal will be represented by non-zero digital binary integers. In addition, the last one or more coefficients in the typical ordered signal will be represented by binary zeros.

In a preferred embodiment, the ordered vectors are then run-length encoded (block 312) wherein the last run of zeros is represented by a special end of block character that signifies that the rest of the coefficients in the ordered vector are zero. The run-length encoded signal corresponding to each block of each component plane of each frame of the video signal is then used to construct the compressed video signal that is either transmitted or stored or both.

Figure 7:
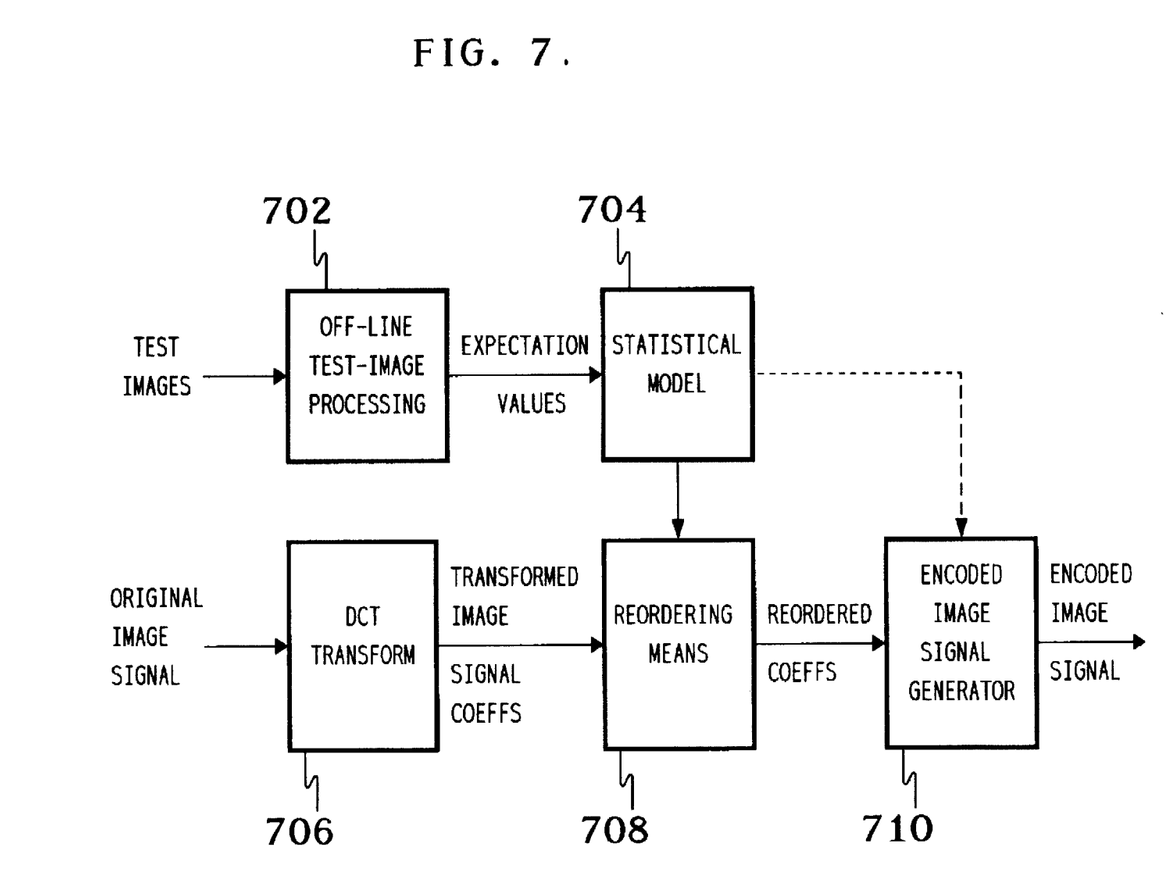
FIG. 7 is a block diagram of an encoder for implementing part of the processing of FIG. 3.

Referring now to FIG. 7, there is shown a block diagram of an encoder for implementing part of the processing of FIG. 3, according to a preferred embodiment of the present invention. DCT transform 706 receives original image signals and applies a DCT transform to generate transformed image signal coefficients $y_i$. Reordering means 708 reorders the coefficients $y_i$ to generate the reordered coefficients $r_i$ based on the statistical model 704, which was generated empirically by off-line processing 702 of test images. The reordered coefficients $r_i$ are encoded by generator 710 to generate the encoded image signal. The statistical model may also be encoded into the encoded image signal.

Figure 5:
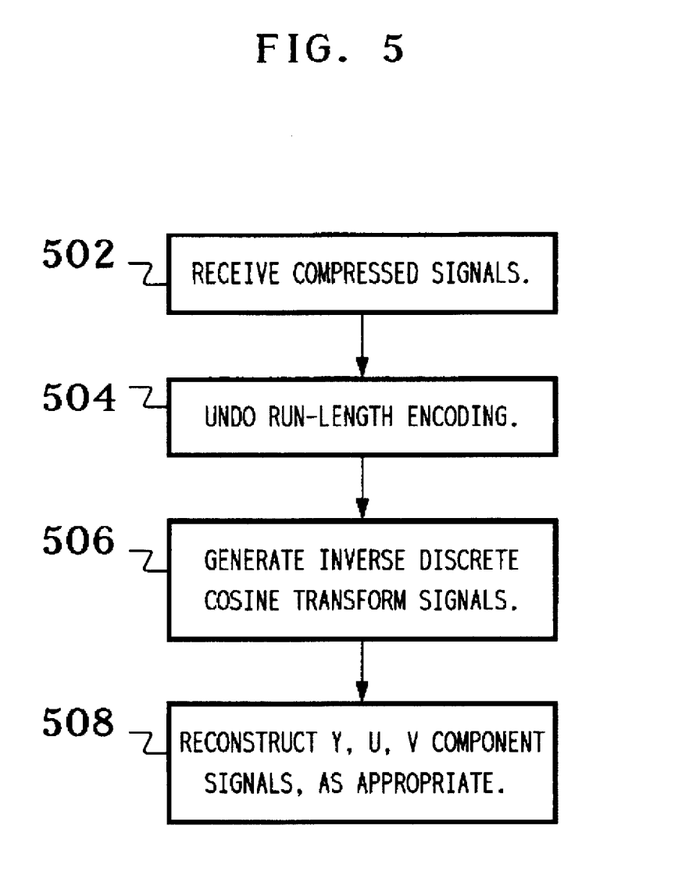
FIG. 5 is a process flow diagram of the decoding processing implemented by the host processor of the computer system of FIG. 2.

Referring now to FIG. 5, there is shown a process flow diagram of the decompression processing implemented by host processor 208 of decoding system 200 of FIG. 2, according to a preferred embodiment of the present invention. Host processor 208 receives the compressed video signals from either receiver 210 or mass storage device 212 (block 502 of FIG. 5). Host processor 208 undoes the run-length encoding performed by pixel processor 106 of FIG. 1 (block 504).

Host processor 208 then applies an inverse discrete cosine transform (IDCT) to invert the FDCT implemented by pixel processor 106 (block 506). IDCT processing of an (8×8) block in the transform domain may be represented as Equation (8) as follows:

$$x(i,j) = \quad (8)$$

$$1/4 \sum_{i=0}^{7} \sum_{j=0}^{7} C(u)C(v)y(u,v)\cos\left(\frac{(2i+1)u\pi}{16}\right)\cos\left(\frac{(2j+1)v\pi}{16}\right),$$

where $x(i,j)$, $y(u,v)$, $C(u)$, and $C(v)$ are defined as they were earlier in the specification for Equation (1). Those skilled in the art will understand that the IDCT of Equation (8) may be presented in matrix form by Equation (9) as follows:

$$X=IY, \quad (9)$$

where vectors X and Y are the reconstructed spatial domain signal and transform domain signals (with their original order restored), respectively, analogous to those defined in Equations (7) and (5) above, and I is the IDCT matrix defined by Equation (10) as follows:

$$I = \begin{bmatrix} g_{0,0} & g_{1,0} & \cdots & g_{63,0} \\ g_{0,1} & & & \\ \cdots & & & \\ g_{0,63} & & & g_{63,63} \end{bmatrix}, \quad (10)$$

where:

$$g_{i,j} = 1/4 C(i\backslash 8)C(j\bmod 8)\cos\left(\frac{(2(i\backslash 8)+1)(i\backslash 8)\pi}{16}\right)\cos\left(\frac{(2(i\bmod 8)+1)(j\bmod 8)\pi}{16}\right) \quad (11)$$

where "\" signifies integer division without rounding.

Host processor 208 then uses the results from Equation (9) to reconstruct the Y, U, and V component signals for the current frame using the appropriate interframe and/or intraframe techniques (block 508). These reconstructed component signals may then be scaled for display as described earlier in the specification in conjunction with FIG. 2.

Figure 6:
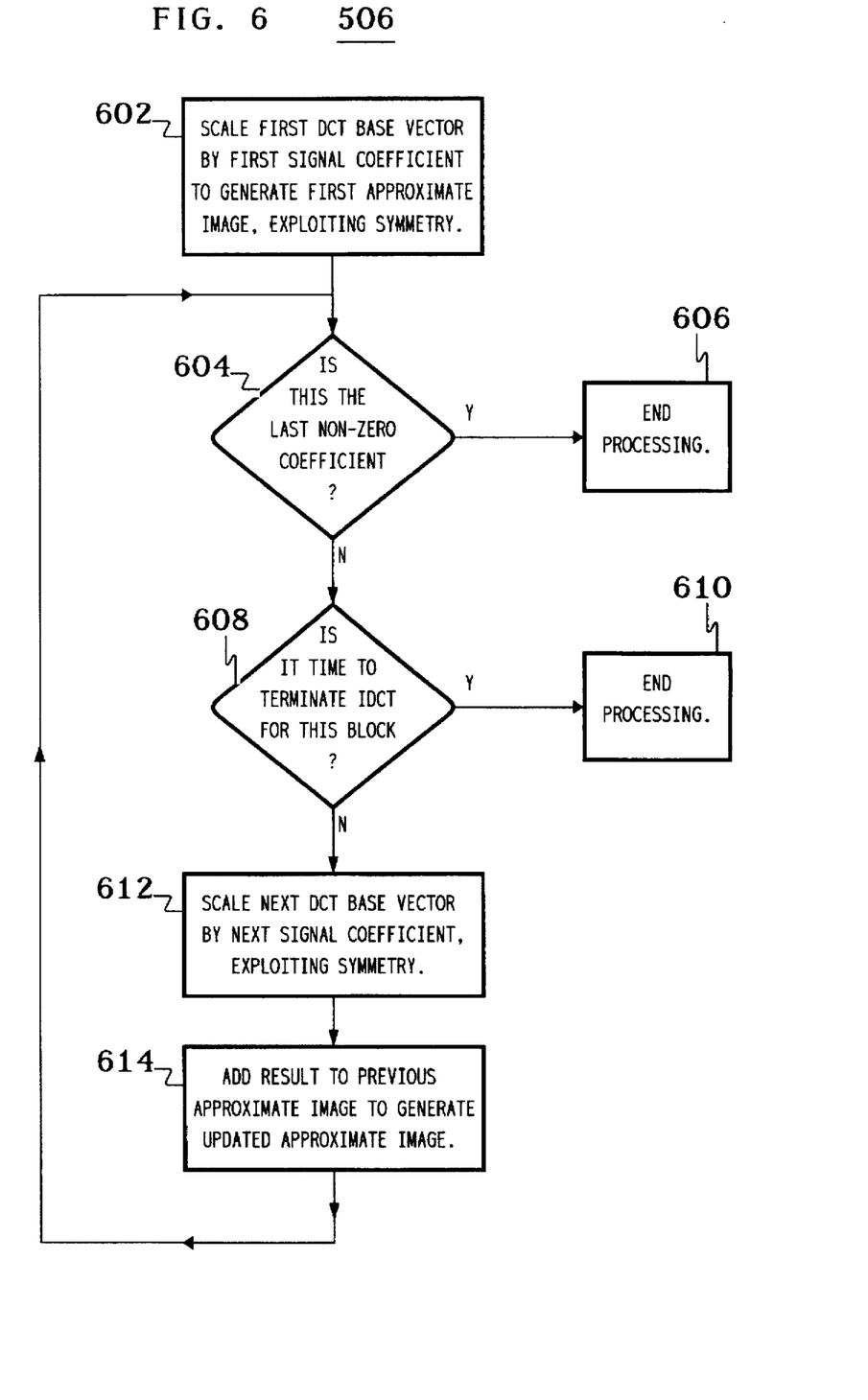
FIG. 6 is a process flow diagram of the inverse discrete transform processing implemented by the host processor of the decoding system of FIG. 2.

Referring now to FIG. 6, there is shown a process flow diagram of the inverse discrete transform processing (block 506 of FIG. 5) implemented by host processor 208 of decoding system 200 of FIG. 2, according to a preferred embodiment of the present invention. Those skilled in the art will also understand that the IDCT of Equation (9) may be represented according to Equation (12) as follows:

$$X = \sum_{i=0}^{63} I[f(i)] r_i, \qquad (12)$$

where $r_i$ are the reordered coefficients of the ordered signal in the transform domain and $I[\ ]$ are the columns of the IDCT matrix I of Equation (10), also referred to as the base vectors for IDCT processing.

The function $f(i)$ is a mapping of the order of the reordered coefficients $r_i$ back to the original order of the coefficients $y_i$. Thus, for the earlier example in which $(r_0, r_1, \ldots, r_{63}) = (y_5, y_{23}, \ldots, y_{11})$, $f(0)=5$, $f(1)=23$, and $f(63)=11$.

Those skilled in the art will understand that each addend of Equation (12) is the product of a reordered coefficient $r_i$ and the corresponding column $I[\ ]$ of the IDCT matrix I of Equation (10). For the earlier example, the first addend $(I[f(0)] r_0)$ of Equation (12) is the product of first reordered coefficient $r_0$ and the sixth column $I[5]$ of the IDCT matrix I; the second addend $(I[f(1)] r_1)$ is the product of second reordered coefficient $r_0$ and the twenty-fourth column $I[23]$ of the IDCT matrix I; and the sixty-fourth addend $(I[f(63)] r_{63})$ is the product of sixty-fourth reordered coefficient $r_{63}$ and the twelfth column $I[11]$ of the IDCT matrix I.

In this preferred embodiment of Equation (12), the reordered coefficients $r_i$ are not returned to the original order of the coefficients $y_i$, but rather are processed in the order in which they appear in the encoded bitstream (i.e., the order in accordance with the statistical analysis). Those skilled in the art will understand that the mapping function $f(i)$ may be agreed upon between the encoder and decoder and hard-coded into each, or, alternatively, the function may be transmitted from the encoder to the decoder as part of the encoded bitstream.

As described earlier in the specification in conjunction with the encoding processing of FIG. 3, the signal Y is ordered such that coefficient $y_0$ is the coefficient with the expected value with the greatest magnitude and the coefficient $y_{63}$ is the coefficient with the expected value with the smallest magnitude. Since, the last one or more coefficients in a typical ordered signal will be zero, there is no need to complete the summation of Equation (12) for those indices i. In a preferred embodiment, host processor 208 terminates IDCT processing for a given (8×8) block of component data when the unique end-of-block character is detected in the compressed signal (block 604 of FIG. 6). Those skilled in the art will understand that the ordering of DCT coefficients and the termination of IDCT processing when the end-of-block character is detected provides faster IDCT processing.

Those skilled in the art will understand further that, since the coefficients are ordered according to decreasing magnitude of expected value, for a typical image, the partial results of Equation (12) after each index i provides an ever better approximation to the complete final summation of products (block 614 of FIG. 6). In this way, a progressive inverse transformation is obtained by approximating the full transform by a partial sum of base vectors scaled by the corresponding ordered coefficients. Thus, when the IDCT processing of the present invention is implemented in a processor with low processing capability, acceptable approximations of each video frame may be generated by truncating the processing of Equation (12) after a specified number of indices i.

Moreover, in a processor with normally sufficient processing capacity, if processing load increases temporarily, the processing of Equation (12) may be truncated for that specific time period without dropping entire video flames from the display sequence. The IDCT scheme of the present invention may also be used for other applications, such as quickly browsing through images stored in a storage device. Such browsing may be implemented by specifying a certain level of approximation to be used to truncate the processing of Equation (12) if such approximate images are suitable for browsing, perhaps for a particular type of image in the data base.

Truncating IDCT processing may also be triggered by other schemes, such as when a specified duration has elapsed, when a specified number of iterations of the IDCT loop have been executed, or when the next encoded signal has been received and is ready for IDCT processing. Truncation of IDCT processing is shown in general in block 608 of FIG. 6.

The present invention preferably includes additional features for increasing the speed of inverse transform processing. Those skilled in the art will understand that for some transforms, the elements of the column vectors of the inverse transform (e.g., the base vectors for IDCT processing) may demonstrate certain symmetries. (See blocks 602 and 612 of FIG. 6.) For example, in the IDCT, all of the elements of the so-called DC base vector are the same. In that case, there is no need to multiply the ordered coefficient $y_i$ by each element of that base vector. According to a preferred embodiment of the present invention, the ordered coefficient $y_i$ is multiplied by the first element of the DC base vector once. The other products corresponding to the other elements are generated by copying the result of the first multiplication.

According to a preferred embodiment of the present invention, symmetry is similarly exploited whenever two or more elements of a base vector have the same magnitude. If elements are equal, symmetry is exploited by copying the result of only one multiplication. If elements are negatives of one another, symmetry is exploited by copying the complement of the result of only one multiplication. Those skilled in the art will understand that faster IDCT processing is achieved by copying similar products rather than by repeating redundant multiplications.

Figure 8:
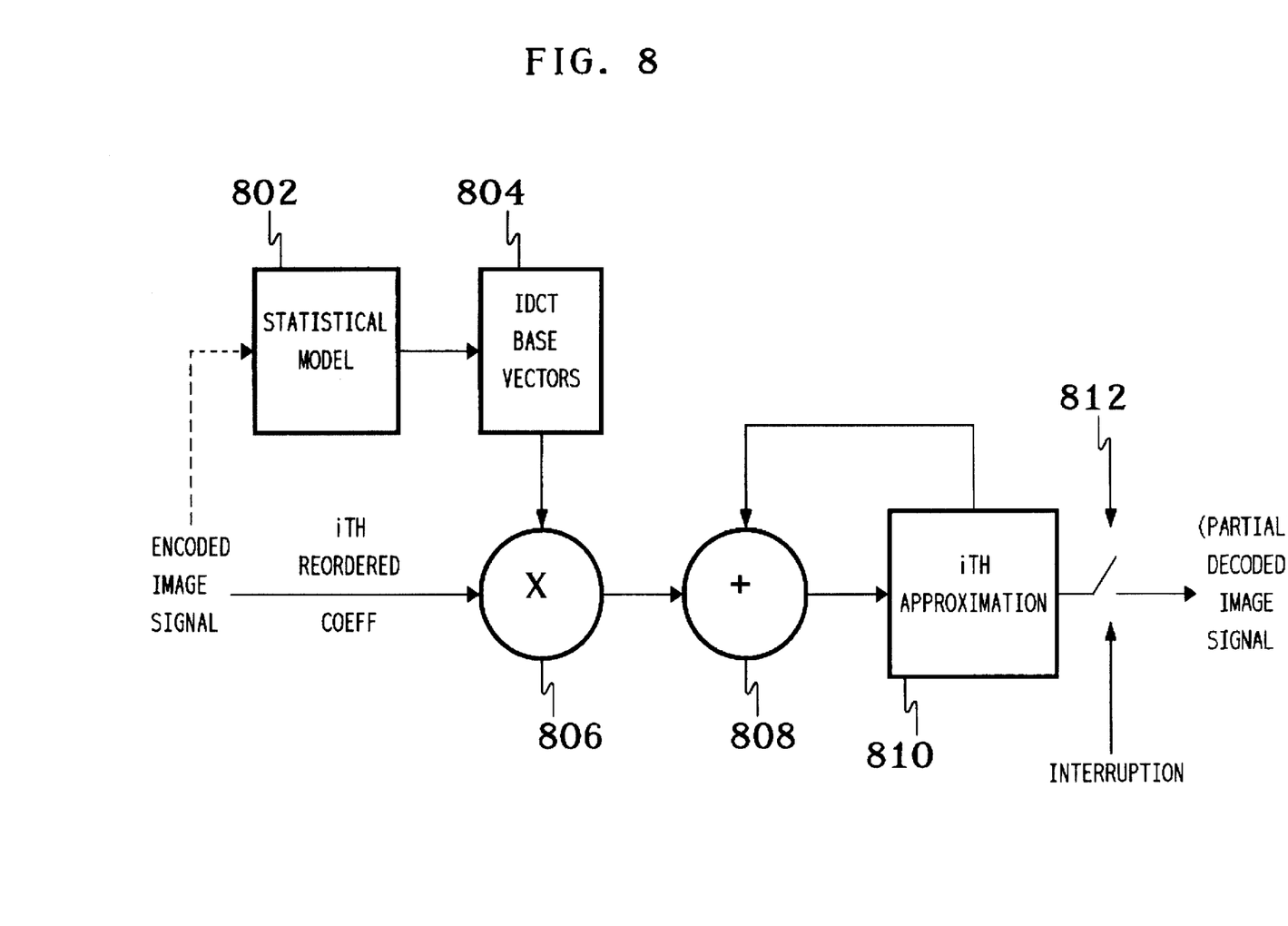
FIG. 8 is a block diagram of a decoder for implementing the processing of FIG. 6.

Referring now to FIG. 8, there is shown a block diagram of a decoder for implementing the processing of FIG. 6, according to a preferred embodiment of the present invention. Multiplier 806 sequentially multiplies the reordered coefficients $r_i$ recovered from an encoded image signal by the corresponding IDCT base vectors, which are selected based on the statistical model 802, which may also be recovered from the encoded image signal. Adder 808 adds the resulting products to the previous approximation and stores the updated approximation in memory 810. This continues until all 64 of the coefficients for an (8×8) block are processed or until an interrupting event occurs (e.g., timer expires) to close switch 812 and output the partial decoded image signal.

Those skilled in the art will understand that the present invention may be used to implement transforms and inverse transforms other than the discrete cosine transform. These include the slant transform, the Haar transform, the Fourier transform, and the Karhunen-Loeve transform. In general, the present invention may be used whenever the inverse transform may be represented as a matrix comprised of columns that may be treated as base vectors.

Those skilled in the art will also understand that signals other than video signals may be processed with the present invention. For example, transforms and inverse transforms may be applied to compress and decompress audio signals by converting from a temporal domain to a transform domain. The present invention may also be used to process signals corresponding to mechanical analyses such as those for finite element analysis of such things as vibrations, temperatures, and stresses.

It will also be understood that the progressive decoding technique for images may be accelerated in hardware by adding a special bitblt with addition (i.e., bitblt/add) capability to the graphics controller. After scaling a base vector by its corresponding coefficient, the result may be added to the frame buffer through the bitblt/add. Bitblt/add capability exists in some Microsoft® Windows® accelerator components. In addition, image quality may be improved by implementing a simple filtering process to eliminate most of the edge effects due to the blocking scheme.

Transmission of digitally encoded images is often limited by the available bandwidth of the channel linking the transmitting and receiving stations (e.g., systems 100 and 200 of FIGS. 1 and 2, respectively). Progressive image transmission techniques within the scope of the present invention may be used to transmit first the most important characteristics of an image with respect to viewer recognition. Subsequent transmissions may deliver less important information to the decoder, incrementally refining the received image until the image is fully reconstructed, or until dynamically varying channel bandwidth halts or further restricts the transmission process.

The techniques for progressive transmission may be grouped into two main categories: transmission of selected DCT coefficients at full accuracy in a progressive order and transmission of all coefficients in a sequence of progressive accuracy.

Techniques that fall into the first category establish some ordering of the DCT coefficients. This may be accomplished in a variety of different ways. For example, (1) the first largest coefficient in each block may be transmitted for all blocks, followed by the second largest, and so on until a total of N coefficients are transmitted; (2) the N largest coefficients may be transmitted regardless of their position in the image; or (3) coefficients may be transmitted in order of their visual importance as determined on the basis of more elaborate criteria. In each case, there may be some coding penalty in reordering the coefficients, but such penalty may be kept small with suitable coding methods.

A method falling into the second category of progressive transmission techniques is the transmission of progressive approximations to the coefficients instead of the coefficients themselves. One such method is to divide the quantization step size in half each time. The coded bit stream produces a sequential binary approximation to the coefficient values. A resolution of approximately three bits per pixel may be obtained by encoding the first three most significant bits of the binary representations of the coefficients. Increased image resolution may be achieved by further subdividing the quantization interval, and transmitting the increasingly accurate DCT coefficients.

It will be appreciated by those skilled in the art that the present invention may be used to generate a single type of encoded signal that may be decoded by different types of decoding systems with different processing capacities and bandwidths. The present invention may also be used to provide scalable encoding in which the encoder tailors the encoding process to the currently available environment. Encoding scalability may be used in applications with variable bandwidth of the transmission channel. For example, in very low bit rate applications, such as telephone-based video and audio teleconferencing applications, where the bandwidth is dynamically allocated between audio and video, the encoder may take advantage of silence in the audio channel to enhance the transmitted picture quality.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding image signals, comprising the steps of:
   (a) providing an original image signal corresponding to a particular type of image;
   (b) applying a transform to the original image signal to generate a transformed image signal, the transformed image signal comprising a plurality of transformed signal coefficients;
   (c) ordering the transformed signal coefficients in accordance with a statistical model generated empirically by applying the transform to one or more test images of the particular type; and
   (d) generating an encoded image signal in accordance with the ordered coefficients.

2. The process of claim 1, wherein step (b) comprises the step of applying a discrete cosine transform to the original image signal.

3. The process of claim 1 wherein step (c) comprises the step of ordering the transformed signal coefficients from highest probability of being non-zero to lowest probability of being non-zero.

4. The process of claim 1, wherein step (c) comprises the step of ordering the transformed signal coefficients from greatest magnitude of expected value to smallest magnitude of expected value.

5. A computer-implemented process for decoding encoded image signals, comprising the steps of:
   (a) providing an encoded image signal, the encoded image signal comprising a plurality of ordered coefficients, the ordered coefficients corresponding to a plurality of transformed signal coefficients ordered in accordance with a statistical model generated empirically by applying a transform to one or more test images of a particular type of image, the plurality of transformed signal coefficients having been generated by transforming an original image signal corresponding to an image of the particular type in accordance with the transform;
   (b) selecting the first ordered coefficient of the encoded image signal;
   (c) generating a first approximation of a decoded image signal corresponding to the encoded image signal in accordance with the first ordered coefficient;
   (d) selecting the next ordered coefficient of the encoded image signal;
   (e) generating an updated approximation of the decoded image signal in accordance with the next ordered coefficient and the previously generated approximation; and (f) repeating steps (d) and (e) for each ordered coefficient of the encoded image signal.

6. The process of claim 5, further comprising the step of:

(g) generating a partial decoded image signal by interrupting step (f) before all of the ordered coefficients of the encoded image signal have been used to generate updated approximations of the decoded image signal.

7. The process of claim 6, wherein step (g) comprises the step of interrupting step (f) in accordance with one of the following events:

(1) a last non-zero ordered coefficient has been used to generate an updated approximation;

(2) a specified time period has elapsed;

(3) a next encoded image signal has been received; and (4) a specified number of iterations of steps (d) and (e) have been implemented.

8. The process of claim 5, wherein:

step (c) comprises the step of generating the first approximation by scaling a first ordered base vector by the first ordered coefficient; and step (e) comprises the step of generating the updated approximation by scaling the selected ordered coefficient by a corresponding base vector and adding the result to the previously generated updated approximation.

9. The process of claim 8, wherein:

step (c) comprises the steps of:

(1) multiplying the first ordered coefficient and an element of the first ordered base vector;

(2) copying the result of step (c)(1) for every element of the first ordered base vector equal to the element of step (c)(1); and (3) copying the complement of the result of step (c)(1) for every element of the first ordered base vector equal to the negative of the element of step (c)(1); and step (e) comprises the steps of:

(1) multiplying the selected ordered coefficient and an element of the corresponding ordered base vector;

(2) copying the result of step (e)(1) for every element of the corresponding ordered base vector equal to the element of step (e)(1); and (3) copying the complement of the result of step (e)(1) for every element of the corresponding ordered base vector equal to the negative of the element of step (e)(1).

10. The process of claim 5, wherein the transform comprises a discrete cosine transform.

11. The process of claim 5, wherein the transformed signal coefficients are ordered from highest probability of being non-zero to lowest probability of being non-zero.

12. The process of claim 5, wherein the transformed signal coefficients are ordered from greatest magnitude of expected value to smallest magnitude of expected value.

13. An apparatus for encoding image signals, comprising:

(a) means for providing an original image signal corresponding to a particular type of image;

(b) means for applying a transform to the original image signal to generate a transformed image signal, the transformed image signal comprising a plurality of transformed signal coefficients;

(c) means for ordering the transformed signal coefficients in accordance with a statistical model generated empirically by applying the transform to one or more test images of the particular type; and (d) means for generating an encoded image signal in accordance with the ordered coefficients.

14. The apparatus of claim 13, wherein means (b) comprises means for applying a discrete cosine transform to the original image signal.

15. The apparatus of claim 13, wherein means (c) comprises means for ordering the transformed signal coefficients from highest probability of being non-zero to lowest probability of being non-zero.

16. The apparatus of claim 13, wherein means (c) comprises means for ordering the transformed signal coefficients from greatest magnitude of expected value to smallest magnitude of expected value.

17. An apparatus for decoding encoded image signals, comprising:

(a) means for providing an encoded image signal, the encoded image signal comprising a plurality of ordered coefficients, the ordered coefficients corresponding to a plurality of transformed signal coefficients ordered in accordance with a statistical model generated empirically by applying a transform to one or more test images of a particular type of image, the plurality of transformed signal coefficients having been generated by transforming an original image signal corresponding to an image of the particular type in accordance with the transform;

(b) means for selecting the first ordered coefficient of the encoded image signal;

(c) means for generating a first approximation of a decoded image signal corresponding to the encoded image signal in accordance with the first ordered coefficient;

(d) means for selecting the next ordered coefficient of the encoded image signal;

(e) means for generating an updated approximation of the decoded image signal in accordance with the next ordered coefficient and the previously generated approximation; and (f) means for repeating the functions of means (d) and (e) for each ordered coefficient of the encoded image signal.

18. The apparatus of claim 17, further comprising:

(g) means for generating a partial decoded image signal by interrupting means (f) before all of the ordered coefficients of the encoded image signal have been used to generate updated approximations of the decoded image signal.

19. The apparatus of claim 18, wherein means (g) comprises means for interrupting means (f) in accordance with one of the following events:

(1) a last non-zero ordered coefficient has been used to generate an updated approximation;

(2) a specified time period has elapsed;

(3) a next encoded image signal has been received; and (4) a specified number of iterations of steps (d) and (e) have been implemented.

20. The apparatus of claim 17, wherein:

means (c) comprises means for generating the first approximation by scaling a first ordered base vector by the first ordered coefficient; and means (e) comprises means for generating the updated approximation by scaling the selected ordered coefficient by a corresponding base vector and adding the result to the previously generated updated approximation.

21. The apparatus of claim 20, wherein:

means (c) comprises:
- (1) means for multiplying the first ordered coefficient and an element of the first ordered base vector;
- (2) means for copying the result of means (c)(1) for every element of the first ordered base vector equal to the element of means (c)(1); and
- (3) means for copying the complement of the result of means (c)(1) for every element of the first ordered base vector equal to the negative of the element of means (c)(1); and means (e) comprises:
- (1) means for multiplying the selected ordered coefficient and an element of the corresponding ordered base vector;
- (2) means for copying the result of means (e)(1) for every element of the corresponding ordered base vector equal to the element of means (e)(1); and
- (3) means for copying the complement of the result of means (e)(1) for every element of the corresponding ordered base vector equal to the negative of the element of means (e)(1).

22. The apparatus of claim 17, wherein the transform comprises a discrete cosine transform.

23. The apparatus of claim 17, wherein the transformed signal coefficients are ordered from highest probability of being non-zero to lowest probability of being non-zero.

24. The apparatus of claim 17, wherein the transformed signal coefficients are ordered from greatest magnitude of expected value to smallest magnitude of expected value.

25. A system for encoding image signals, comprising an encoding processor, wherein:

the encoding processor applies a transform to an original image signal corresponding to a particular type of image to generate a transformed image signal, the transformed image signal comprising a plurality of transformed signal coefficients;

the encoding processor orders the transformed signal coefficients in accordance with a statistical model generated empirically by applying the transform to one or more test images of the particular type; and the encoding processor generates an encoded image signal in accordance with the ordered coefficients.

26. The system of claim 25, wherein the encoding processor applies a discrete cosine transform to the original image signal.

27. The system of claim 25, wherein the encoding processor orders the transformed signal coefficients from highest probability of being non-zero to lowest probability of being non-zero.

28. The system of claim 25, wherein the encoding processor orders the transformed signal coefficients from greatest magnitude of expected value to smallest magnitude of expected value.

29. A system for decoding encoded image signals, comprising a decoding host processor, wherein the decoding host processor:

- (1) selects the first ordered coefficient of an encoded image signal, the encoded image signal comprising a plurality of ordered coefficients, the ordered coefficients corresponding to a plurality of transformed signal coefficients ordered in accordance with a statistical model generated empirically by applying a transform to one or more test images of a particular type of image, the plurality of transformed signal coefficients having been generated by transforming an original image signal corresponding to an image of the particular type in accordance with the transform;
- (2) generates a first approximation of a decoded image signal corresponding to the encoded image signal in accordance with the first ordered coefficient;
- (3) selects the next ordered coefficient of the encoded image signal;
- (4) generates an updated approximation of the decoded image signal in accordance with the next ordered coefficient and the previously generated approximation; and
- (5) repeats operations (3) and (4) for each ordered coefficient of the encoded image signal.

30. The system of claim 29, wherein the decoding host processor:
- (6) generates a partial decoded image signal by interrupting operation (5) before all of the ordered coefficients of the encoded image signal have been used to generate updated approximations of the decoded image signal.

31. The system of claim 30, wherein the decoding host processor interrupts operation (5) in accordance with one of the following events:
- (1) a last non-zero ordered coefficient has been used to generate an updated approximation;
- (2) a specified time period has elapsed;
- (3) a next encoded image signal has been received; and
- (4) a specified number of iterations of steps (d) and (e) have been implemented.

32. The system of claim 29, wherein the decoding host processor:

generates the first approximation by scaling a first ordered base vector by the first ordered coefficient; and generates the updated approximation by scaling the selected ordered coefficient by a corresponding base vector and adding the result to the previously generated updated approximation.

33. The system of claim 32, wherein the decoding host processor:

multiplies the first ordered coefficient and an element A of the first ordered base vector;

copies the result of the multiplication for every element of the first ordered base vector equal to the element A;

copies the complement of the result of the multiplication for every element of the first ordered base vector equal to the negative of the element A;

multiplies the selected ordered coefficient and an element B of the corresponding ordered base vector;

copies the result of the multiplication for every element of the corresponding ordered base vector equal to the element B; and copies the complement of the result of the multiplication for every element of the corresponding ordered base vector equal to the negative of the element B.

34. The system of claim 29, wherein the transform comprises a discrete cosine transform.

35. The system of claim 29, wherein the transformed signal coefficients are ordered from highest probability of being non-zero to lowest probability of being non-zero.

36. The system of claim 29, wherein the transformed signal coefficients are ordered from greatest magnitude of expected value to smallest magnitude of expected value.

* * * * *